US012566679B1

(12) United States Patent
Mizrachi et al.

(10) Patent No.: US 12,566,679 B1
(45) Date of Patent: Mar. 3, 2026

(54) SYSTEM AND METHOD FOR ENHANCED SEARCHING OF DATABASES USING CATALOGUED METADATA

(71) Applicant: EON IO Ltd., Tel Aviv (IL)

(72) Inventors: Ran Mizrachi, Mishmar Hashiva (IL); Ron Kimchi, Tel Aviv (IL); Yaniv Ptashnik, Tel Mond (IL); Peleg Kazaz, Tel Aviv (IL); Dmitry Kuznetsov, Tel Aviv Yafo (IL); Assaf Natanzon, Tel Aviv (IL)

(73) Assignee: Eon IO Ltd., Tel Aviv (IL)

( * ) Notice: Subject to any disclaimer, the term of this patent is extended or adjusted under 35 U.S.C. 154(b) by 0 days.

(21) Appl. No.: 18/916,260

(22) Filed: Oct. 15, 2024

(51) Int. Cl.
　　G06F 11/14　　　(2006.01)
　　G06F 11/1446　　(2026.01)
(52) U.S. Cl.
　　CPC ...... G06F 11/1469 (2013.01); G06F 2201/80 (2013.01)
(58) Field of Classification Search
　　CPC ............. G06F 16/90335; G06F 16/245; G06F 11/1469; G06F 2201/80
　　See application file for complete search history.

(56) References Cited

U.S. PATENT DOCUMENTS

| | | | | |
|---|---|---|---|---|
| 11,941,014 | B1 * | 3/2024 | Das | G06F 16/219 |
| 2021/0019333 | A1 * | 1/2021 | Attarde | G06F 16/215 |

OTHER PUBLICATIONS

Amazon, "Amazon EBS fast snapshot restore," 2025; 2 pages; accessed via web at https://docs.aws.amazon.com/ebs/latest/userguide/ebs-fast-snapshot-restore.html.
Amazon, "Amazon EBS snapshots," 2025; 1 page; accessed via web at https://docs.aws.amazon.com/ebs/latest/userguide/ebs-snapshots.html.
Amazon, "How Amazon EBS Snapshots Work," 2025; 3 pages; accessed via web at https://docs.aws.amazon.com/ebs/latest/userguide/how_snapshots_work.html.
Rubrik, "Exploring the Depth of Simplicity: Protecting Microsoft SQL Server with Rubrik," Technical White Paper; Mar. 2017; 15 pages.
Rubrik, "Protecting Microsoft SQL Server with Rubrik," Rubrik Technical Marketing; Technical White Paper; Sep. 2023; 31 pages.

* cited by examiner

*Primary Examiner* — Ajay M Bhatia
*Assistant Examiner* — Cindy Nguyen
(74) *Attorney, Agent, or Firm* — M&B IP Analysts, LLC

(57)　　　　　　ABSTRACT

In one embodiment, a method comprises receiving a search request from a user; responsive to the search request, searching a plurality of metadata records corresponding to a plurality of databases, a metadata record of the plurality of metadata records comprising a plurality of searchable metadata items of a database of the plurality of databases, wherein the plurality of searchable metadata items of the metadata record includes a name of a table of the database; and providing search results responsive to the search request, the search results comprising indications of a subset of the plurality of metadata records that match the search request.

20 Claims, 7 Drawing Sheets

106

204

208

202

206

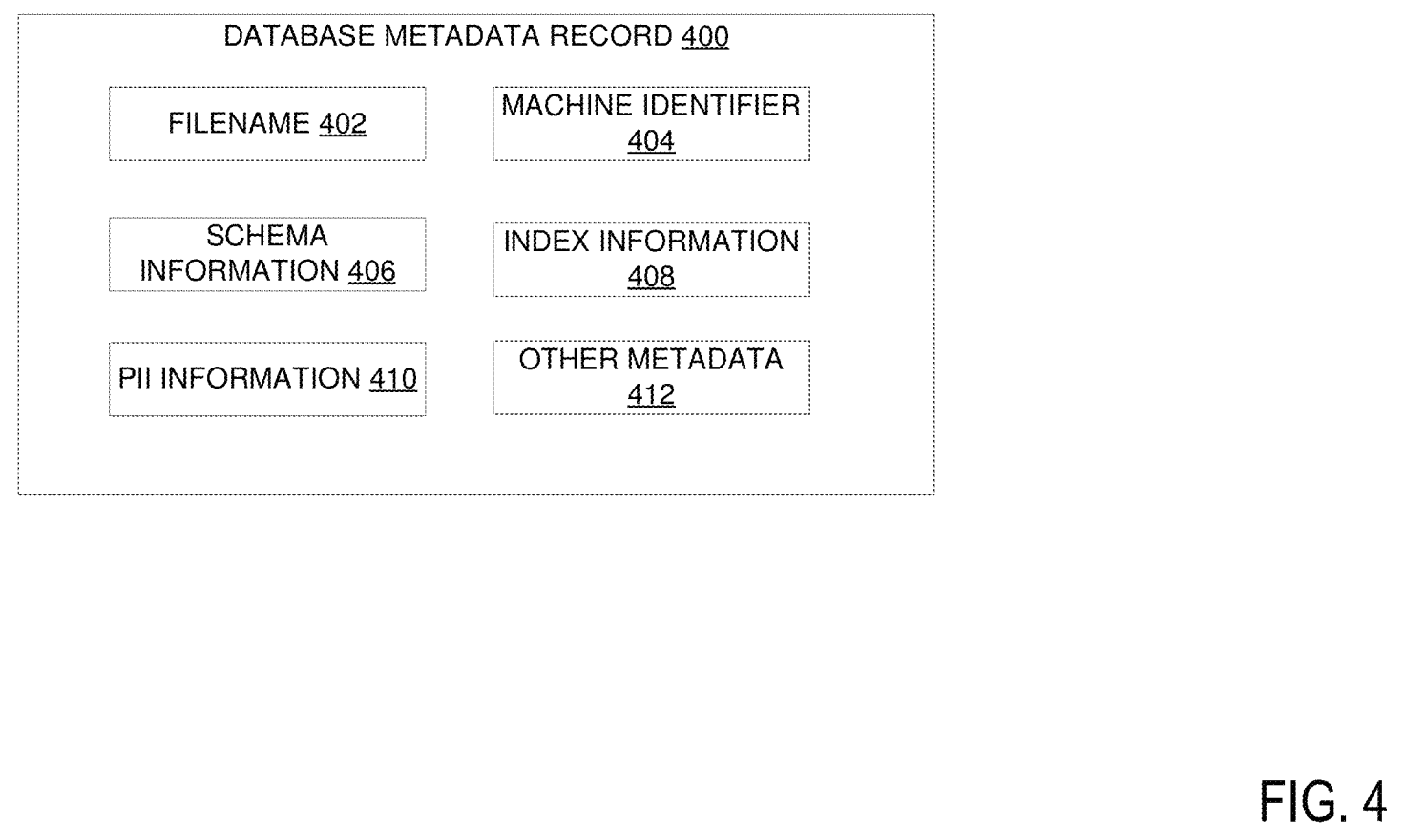

DATABASE METADATA RECORD 400

FILENAME 402

MACHINE IDENTIFIER 404

SCHEMA INFORMATION 406

INDEX INFORMATION 408

PII INFORMATION 410

OTHER METADATA 412

FIG. 4

602 — ACCESS CREDENTIAL INFORMATION

604 — SCAN DATABASE ENVIRONMENT OF ORGANIZATION

606 — CREATE DATABASE METADATA RECORDS

608 — SERVICE SEARCH REQUESTS

610 — UPDATE DATABASE METADATA RECORDS

702 — RECEIVE SEARCH REQUEST

704 — ACCESS DATABASE METADATA RECORDS

706 — IDENTIFY RESOURCES MATCHING SEARCH CRITERIA

708 — PROVIDE IDENTIFICATIONS OF MATCHING RESOURCES

SYSTEM AND METHOD FOR ENHANCED SEARCHING OF DATABASES USING CATALOGUED METADATA

TECHNICAL FIELD

This disclosure relates in general to the field of mobile applications and, more particularly, to a system and method for enhanced searching of databases using catalogued metadata.

BACKGROUND

Cloud database backup is the process of creating and storing copies of a database in a remote, cloud-based environment to ensure data availability, protection, and recovery in case of failure or data loss. While organizations may utilize traditional on-premises backups, cloud backups offer greater flexibility and scalability, allowing businesses to adjust storage as needed and access their data from anywhere with an internet connection. Cloud backups typically provide automated processes, encryption, and redundancy across multiple servers, enhancing both security and reliability. This ensures that businesses can recover their databases quickly, minimizing downtime and mitigating the risk of data breaches or corruption.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 illustrates an example database metadata record, in accordance with any of the embodiments disclosed herein.

DETAILED DESCRIPTION OF EXAMPLE EMBODIMENTS

Figure 1:
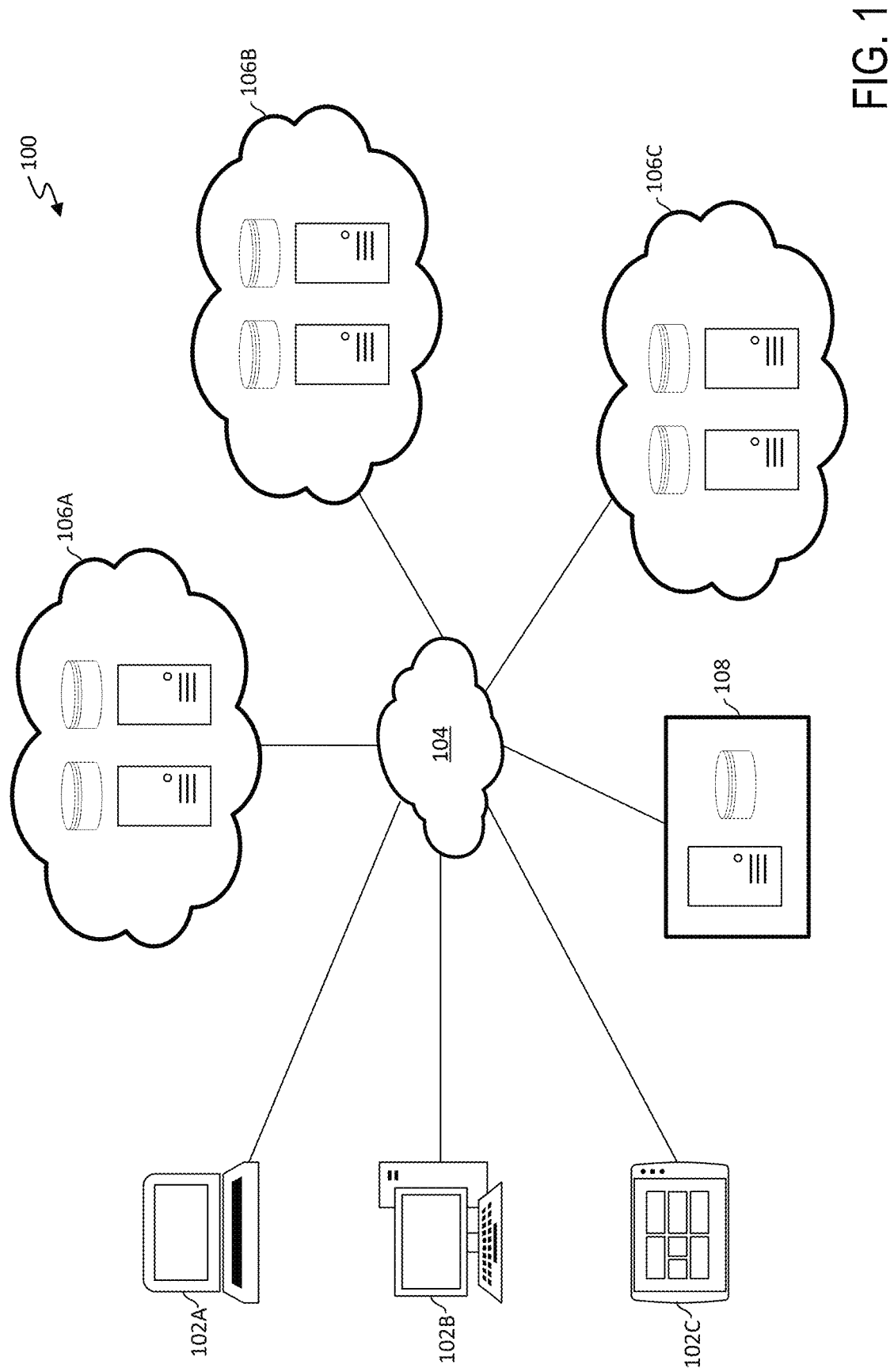
FIG. 1 illustrates a block diagram of a cloud database backup environment, in accordance with any of the embodiments disclosed herein.

FIG. 1 illustrates a block diagram of a cloud database backup environment 100, in accordance with any of the embodiments disclosed herein. An organization (e.g., any one or more users associated with each other) may be associated with any number of databases that are accessed by users associated with the organization. As used herein, "database" may refer to one or more of a database that is not backed up, a database that is backed up, a backup of a database, or a backup of multiple versions of a database. The users may interact with the databases using computing devices 102 (e.g., 102A, 102B, 102C).

The databases may be stored (temporarily or persistently) at a site owned or leased by the organization, at another location (e.g., owned or managed by a cloud service provider), or at multiple locations. The databases of an organization may be backed up in the cloud, e.g., within a backend 106 (e.g., 106A, 106B, 106C) of a cloud backup service provider, across multiple backends of the same cloud backup service provider, at one or more backends of a different cloud backup service provider, at another suitable location (e.g., at a local site of the organization), or any combination thereof (e.g., some databases may be backed up at backend 106A, other databases may be backed up at backend 106B, and some databases may be backed up at a local site).

An organization may include any number of users that utilize computing devices 102 to perform operations with respect to databases associated with the organization. The interaction between a user and a database may be indirect and facilitated by a frontend interface, such as a web browser, a desktop application, a mobile application, or other interface. The interface may translate requests of the user into a format (e.g., a database query language, such as Structured Query Language (SQL)) that is compatible with a database management system (DBMS) which processes the requests and returns requested data and/or confirmation of completion of requests. The interface may then present the requested data or confirmation in a format that is user friendly. In some instances, a user may interface with a database in a more direct manner, e.g., through a database client tool that allows the user to write and execute database queries directly.

Large organizations tend to have significant amounts of databases. For example, a large enterprise may have hundreds, thousands, or even tens of thousands of databases (or at least tens of thousands of database tables within hundreds or thousands of different databases). In such environments, finding the correct database (or more particularly the correct table of a database) in order to restore data (e.g., a full database, a specific table, etc.) may be very tedious. Modern database products allow searching the database machine by its name, but in many cases the machine name is not specific enough to locate target data (e.g., a user can have names such as DB_machine1, DB_machine2, etc.). As one example, a user may notice that a table is missing from a database and may desire to know when the table was deleted. The user may be able to figure this out through examination of a transaction log, but this would be extremely time consuming. For organizations that have thousands of databases, searching within those databases becomes a daunting task.

In various embodiments of the present disclosure, systems and methods for enhanced searching of databases using catalogued metadata are provided. In various embodiments, the enhanced searching may allow for searching of various metadata items of the databases (e.g., table names, table schema information, indexed columns, columns with personally identifiable information (PII)), or other metadata) as well as various changes to the metadata items of the databases (e.g., changes to table schemas, deleted table names, changes to indexed columns, etc.). Various embodiments may provide one or more technical advantages such as faster identification of target data, decreased usage of computing and/or network resources when searching for target data, or other technical advantages.

In the depicted embodiment, the cloud database backup environment 100 includes an enhanced database search system 108. The enhanced database search system 108 may provide any suitable features of the enhanced searching described herein. In other embodiments, any of these features or a subset thereof may be performed by any other suitable logic, such as within one of the backends 106, by a computing device 102 (e.g., through a web application or native application that interfaces with the enhanced database search system 108), or by other suitable logic. For example, enhanced database search system 108 may generate a plurality of database metadata records that may be used in providing the enhanced searches, receive enhanced search requests from computing devices 102, identify search results in accordance with search terms of an enhanced search, and provide enhanced search results to computing devices 102.

Enhanced database search system 108 may include any suitable number of computing devices to perform the functions described herein. In a particular embodiment, the enhanced database search system 108 may comprise a cluster of nodes (e.g., physical or virtual machines) in a Kubernetes environment, although any suitable computing environment may be used to implement the enhanced database search system 108. The enhanced database search system 108 may include and/or manage a plurality of accounts, where a particular account may be associated with (e.g., owned by) a particular organization. Data used to provide enhanced searching functionality for a particular organization may be stored in the account owned by that organization. In various embodiments, the enhanced database search system 108 may be separate from the backends 106 or could be implemented within one of the backends 106.

Computing devices 102 may include any electronic computing device operable to receive, transmit, process, and store any appropriate data. In various embodiments, computing devices 102 may be mobile devices or stationary devices. As examples, mobile devices may include laptop computers, tablet computers, smartphones, personal digital assistants, and other devices capable of connecting (e.g., wirelessly) to network 104 while stationary devices may include desktop computers or other devices that are not easily portable. Computing devices 102 may include a set of programs such as operating systems (e.g., Microsoft Windows, Linux, Android, Mac OSX, Apple IOS, UNIX, or other operating system), applications, and other software-based programs capable of being run, executed, or otherwise used by the respective devices. Each computing device can include at least one graphical display and user interface allowing a user to view and interact with applications and other programs of the computing device to perform operations associated with one or more databases (e.g., searching for databases, modifying database contents, reading database contents, initiating database backups, etc.).

FIG. 1 also depicts a network 104 that couples the computing devices 102, backends 106, and enhanced database search system 108 together. The network 104 may transport communications between computing devices 102, the various backends 106, and the enhanced database search system 108.

Figure 2:
FIG. 2 illustrates a block diagram of a backend of a cloud backup service provider of the environment of FIG. 1, in accordance with any of the embodiments disclosed herein.

FIG. 2 illustrates a block diagram of a backend 106 of a cloud backup service provider of the environment of FIG. 1, in accordance with any of the embodiments disclosed herein. Backend 106 may include various computing systems to provide services (including database backup services) to various organizations. In the embodiment depicted, backend 106 includes compute resources 202, storage resources 204, operations computing systems 206, and networking resources 208.

Compute resources 202 may include hardware components used to provide cloud services, such as general-purpose processors (e.g., central processing units (CPUs), server processors, accelerated processing units (APUs), controllers), specialized processors (e.g., graphics processing units (GPUs), application-specific integrated circuits (ASICs), digital signal processors (DSPs), field programmable gate arrays (FPGAs), neural network processing units (NPUs), data processor units (DPUs), controller cryptoprocessors (specialized processors for cryptographic algorithms)), or accelerators (e.g., graphics accelerators, compression accelerators, artificial intelligence accelerators), or other hardware components.

Storage resources 204 may provide the storage and retrieval of data (e.g., databases (including backups) or associated data). Storage resources 204 may include hardware, such as hard disk drives, solid-state drives, tape storage, or other suitable mechanisms for storing data. Storage resources 204 may store any suitable data in any suitable format(s). For example, storage resources 204 may provide object, block, or file storage. In various embodiments, storage resources 204 may include one or more database management systems (DBMS), such as relational databases (e.g., MySQL, PostgresSQL, SQL Server, Oracle Database, SQLite) and NoSQL data bases (e.g., MongoDB, Cassandra, Redis).

Operations computing systems 206 may include any suitable computing systems to manage the various operations of the backend, such as coordination of incoming and outgoing communications; allocation of compute, storage, and networking resources; monitoring of usage; application deployment; enforcement of security (e.g., identity and access management (IAM), encryption and key management, intrusion detection), and other management tasks.

Networking resources 208 may include any suitable hardware or software to facilitate communication among computer resources 202, storage resources 204, and/or other cloud resources of the backend. Networking resources 208 may include, e.g., routers, switches, firewalls, load balancers, gateways, edge devices, network interface cards, and other suitable networking hardware.

The compute resources 202, storage resources 204, and networking resources 208 may be used to provide compute services to clients of the service provider, such as virtual machines, containers, bare metal servers, or serverless computing.

In various embodiments, a backend 106 is managed by a third party. For example, a backend 106 may be deployed using a cloud service such as Amazon Web Services, Microsoft Azure, or Google Cloud Platform. A backend 106 may provide services to organizations using any suitable service model, such as infrastructure as a service (IaaS), platform as a service (PaaS), or software as a service (Saas), or combinations thereof.

In IaaS, on-demand access is provided to essential information technology (IT) infrastructure, such as servers, storage, and networking, over a virtual interface. Users do not need to manage or maintain physical infrastructure, as it is hosted and managed by the cloud service provider. While the provider handles the underlying hardware and maintenance, users retain control over operating systems, storage, and applications they deploy. This eliminates the need for organizations to manage on-premises infrastructure, offering flexibility and scalability.

In PaaS, a development and deployment environment is provided, including the necessary infrastructure and software tools, for creating and managing applications. Users can develop and run cloud-based applications without managing the underlying infrastructure, such as servers, networks, and storage. PaaS is typically accessed on a pay-as-you-go basis and allows users to focus on application deployment and management, while the cloud provider handles the infrastructure and software maintenance.

In SaaS, users access cloud-based applications provided and maintained by a service provider. Instead of installing software locally, users access the applications via the web or application programming interface (API) on a subscription basis. In this model, the service provider oversees the hardware, software, middleware, and security, eliminating the need for end users to manage or update the software themselves.

An organization may utilize one or more backends 106 to provide database backup for the organization. Database backup is the process of creating a copy of the data of a database that can be used to restore the database in case of data loss, corruption, or other disasters. Backups are essential for data protection, disaster recovery, and ensuring business continuity.

Various types of backups may be performed on the databases of an organization. In a full backup, a complete copy of the entire database is saved in the backup storage. This is the most comprehensive type of backup but can be time consuming and storage intensive. In an incremental backup, only the data that has changed since the last backup (either full or incremental) is saved in the backup storage. This reduces the amount of data to be backed up and speeds up the backup process. In a differential backup, all of the data that has changed since the last full backup is saved in the backup storage. This is faster than a full backup but can grow in size over time until the next full backup. In a transaction log backup, all of the transactions that have occurred since the last transaction log backup are saved in the backup storage. This is often used with full and differential backups to provide point-in-time recovery. This type of backup may utilize less space than other backup options but may require a long time to restore data from the backup storage.

An organization may utilize various backup strategies (and could utilize different backup strategies for different databases). For example, in a full backup strategy, full backups are regularly performed. This strategy may be suitable for small databases where backup time and storage size are not significant concerns. In an incremental backup strategy, a full backup may be performed periodically (e.g., weekly) and incremental backups are performed more often (e.g., daily). This reduces backup time and storage requirements. In a differential backup strategy, a full backup is performed periodically (e.g., weekly) and differential backups are performed more often (e.g., daily). This strategy provides a balance between backup time and storage. In a mixed strategy, various types of strategies (e.g., full, incremental, and transaction log backups) may be combined to optimize backup and recovery times.

An organization may utilize any suitable database backup product to implement their desired backup strategies and to create database backups that are stored on a backend 106 or other location. Various such commercially available products include, e.g., Oracle RMAN (Recovery Manager), Microsoft SQL Server Backup, MySQL Enterprise Backup, pg_dump, pg_basebackup, IBM Db2 Backup, Veritas Net-Backup, Veeam Backup & Replication, and Commvault.

Figure 3:
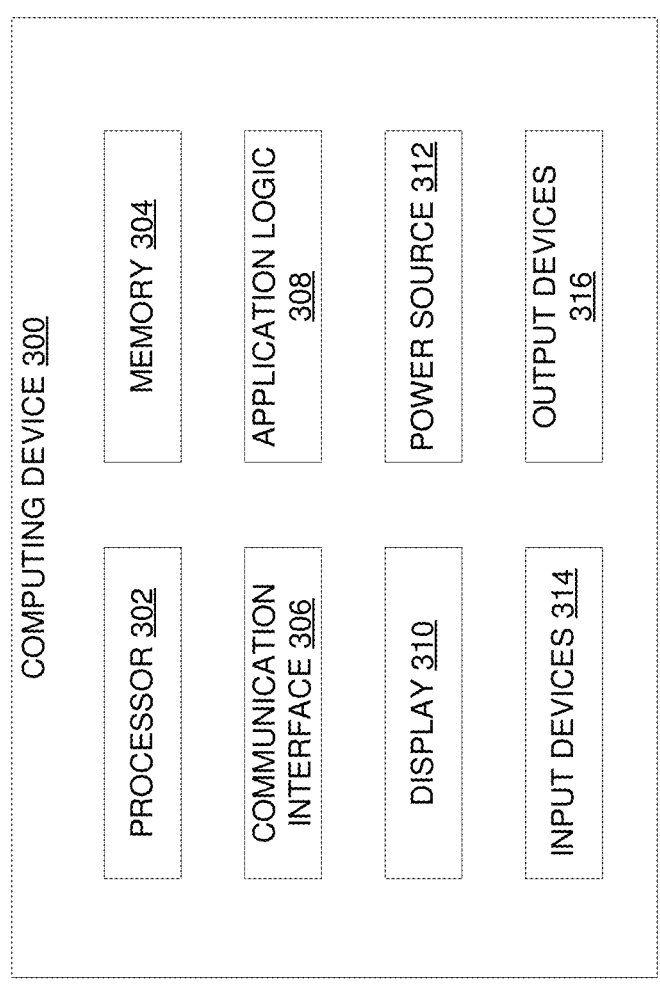
FIG. 3 illustrates a block diagram of a computing device of FIG. 1, in accordance with any of the embodiments disclosed herein.

FIG. 3 illustrates a block diagram of a computing device 300, in accordance with any of the embodiments disclosed herein. One or more computing devices 300 (or portions or alternatives thereof) may be used to implement a computing device 102, one or more portions of enhanced database search system 108, or one or more portions of backends 106. As used in this document, the term computing device is intended to encompass any suitable processing device. A computing device 300 may be operable to receive, transmit, process, store, or manage data and information associated with cloud database backup environment 100.

In the depicted embodiment, computing device 300 includes one or more processors 302, memories 304, communication interfaces 306, application logic 308, display 310, power source 312, input devices 314, and output devices 316, among other hardware and software. These components may work together in order to provide any suitable functionality described herein.

A processor 302 may be any suitable computing device, resource, or combination of hardware, stored software and/or encoded logic operable to provide, either alone or in conjunction with other components of computing device 300, the functionality of the computing device. In particular embodiments, computing device 300 may utilize multiple processors to perform the functions described herein. In various embodiments, processor 302 may include one or more general-purpose processors (e.g., CPUS, server processors, APUs, controllers), specialized processors (e.g., GPUs, general-purpose GPUs, ASICs, DSPs, FPGAs, NPUs, DPUs, controller cryptoprocessors (specialized processors for cryptographic algorithms)), or accelerators (e.g., graphics accelerators, compression accelerators, artificial intelligence accelerators).

A processor can execute any type of instructions to achieve the operations detailed in this specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an application specific integrated circuit (ASIC) that includes digital logic, software, code, electronic instructions, or any suitable combination thereof.

Memory 304 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 304 may store any suitable data or information utilized by a computing device 300, including software embedded in a (e.g., non-transitory) computer readable medium, and/or encoded logic incorporated in hardware or otherwise stored (e.g., firmware). Memory 304 may also store the results and/or intermediate results of the various calculations and determinations performed by processor 302.

Communication interface 306 may be used for the communication of signaling and/or data between computing devices and one or more networks and/or network nodes coupled to a network or other communication channel. For example, communication interface 306 may be used to send and receive network traffic such as data packets. Each communication interface 306 may send and receive data and/or signals according to a distinct standard such as an LTE, IEEE 802.11, IEEE 802.3, or other suitable standard. In some instances, communication interface 306 may include antennae and other hardware for transmitting and receiving radio signals to and from other devices in connection with a wireless communication session over one or more networks.

Application logic 308 may include logic providing, at least in part, the functionality of the computing device. In a particular embodiment, the logic of a computing device 300 may include software (e.g., a web browser, an application, an operating system, etc.) that is executed by processor 302. However, "logic" as used herein, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

Display 310 may include one or more embedded or connected (e.g., via a wired or wireless connection) external visual indicators, such as a computer monitor, a touchscreen display, a liquid crystal display (LCD), a light-emitting diode display, or a flat panel display.

Power source 312 may include one or more energy storage devices (e.g., batteries or capacitors) and/or circuitry for coupling components of the computing device 300 to an energy source separate from the computing device 300 (e.g., alternating current line power).

An input device 314 may accept input from a source external to the computing device 300. Examples of input devices 314 may include an image capture device, keyboard, cursor control device, touchscreen, and an audio device (e.g., microphone), to name a few.

An output device 316 may output signals based on information provided by computing device 300. Examples of output devices 316 include an audio device (e.g., a speaker), an audio codec, a video codec, a printer, a transmitter for providing information to other devices, a storage device, to name a few.

FIG. 4 illustrates an example database metadata record 400, in accordance with any of the embodiments disclosed herein. As alluded to above, enhanced database searching may allow for easier identification of databases and database resources (e.g., tables, columns, or other database portions) based on various types of metadata.

In various embodiments, database metadata records 400 are generated for all or a portion of the databases of an organization (e.g., backed up databases, databases that aren't backed up, databases with multiple versions, etc.) and the database metadata records 400 are stored in a central location (e.g., in the same database file, as associated objects, etc.). In some embodiments, the database metadata records 400 are stored within enhanced database search system 108.

In the embodiment depicted, database metadata record 400 includes file name 402, machine identifier 404, schema information 406, index information 408, PII information 410, and other metadata 412. In other embodiments, any one or more of these metadata items may be omitted.

File name 402 may include, e.g., an alphanumeric string that identifies a name of a database. The filename may also include an extension based on the type of database file (e.g., .db, .sqlite, .mdb, .accdb, .sql, etc.). In some instances, the file name 402 may also include a file path.

Machine identifier 404 may include an identifier of a physical or virtual computing system (e.g., a server) associated with the database. For example, in a physical environment the machine identifier may include an identifier of a physical machine. As another example, in a cloud or virtual environment, the machine identifier may include the name of a virtual machine on which the database is running (e.g., if the database is used in an infrastructure as a service environment) or the name and/or address of a database if the database is run by a managed database service and the infrastructure on which the database runs is unknown. For example, the machine identifier 404 may include a machine name and/or a network address (e.g., an Internet Protocol (IP) address). The computing system may be in a private cloud of the organization, in a backend 106, or other suitable location.

Schema information 406 may specify a structure that defines how data is organized within the database. The schema information 406 may define the logical configuration of various portions of the database (e.g., tables, columns, relationships, keys, indexes, constraints). The schema may define how the data is stored, accessed, and managed. Various examples of schema information 406 are described below. In some examples, the schema information 406 may include any combination of the following.

In an example, the schema information 406 includes names of tables in the database. A table may be a structured collection of related data organized in rows and columns. Each row (also referred to as a record) may represent a single entry in the table (e.g., in a "Students" table, each row might represent an individual student), while each column (also referred to as field or attribute) may represent a specific attribute of the data (e.g., in a "Students" table, columns could include "StudentID", "FirstName", "LastName", "Address", etc.).

In an example, the schema information 406 includes the names of the columns in each table. In another example, the schema information 406 includes the data types of the columns (e.g., integer, varchar, date, Boolean, etc.) that defines the kind of data stored that can be stored in the respective columns.

In another example, the schema information 406 includes one or more relationships between tables. For example, the schema information 406 may include identification of one or more keys, such as a primary key and/or one or more foreign keys. A primary key may be a column (or set of columns) that uniquely identifies each row in a table. The primary key may ensure that no two rows have the same values for the primary key and that these values are not null. Continuing the example above, the "StudentID" column may be the primary key for the "Students" table.

A foreign key is a column (or set of columns) that creates a relationship between two tables by referring to the primary key. A foreign key helps maintain referential integrity, ensuring that data in one table corresponds to valid data in another table. A foreign key in one table may point to the primary key of another table. For example, a foreign key may specify a column in a first table that references a column in a second table, thus constraining the values for the column in the first table to the set of values for the column in the second table. Thus, the foreign key constraint may prevent invalid data from being inserted into the foreign key column since the value inserted has to be one of the values contained in the table with the primary key.

In another example, the schema information 406 includes column constraints. The constraints may include rules that are applied to ensure data integrity. For example, a constraint may require row values for a column to be unique or not null. As another example, a constraint may enforce a condition that must be met for a value to be allowed in a column (e.g., to limit the range or type of data that can be entered).

Database metadata record 400 also includes index information 408. The index information 408 includes indications of which column(s) of the table(s) in the database have been indexed, where the indexing operation enables quicker searching for rows with specific column values. In some embodiments, an index may use a binary tree search with the data in the leaf nodes of the tree (e.g., the index may be stored in a binary tree). In some instances, other data structures may be used to implement an index, such as R-trees, hash indexes, inverted lists, etc.). An index may be a single column index or a composite index (a combination of multiple columns).

Database metadata record 400 also includes PII information 410. PII may include information connected to an individual that can be used to uncover that individual's identity or other sensitive information associated with that individual. Categories of PII may include, e.g., personal details (including information types such as full name, email address, phone number), unique identification numbers (including information types such as driver's license numbers, government-issued ID numbers, social security numbers), biometric data (including information types such as fingerprint, retinal scan data, other biological characteristic), financial information (including information types such as bank account numbers, credit card numbers, debit card numbers), medical records, or other sensitive information.

In one example, the PII information 410 may include indications of which columns include PII information (e.g., a list of the names of the columns that include PII, a binary indication for each column as to whether the column includes PII, etc.). As another example, for columns that include PII, the PII information 410 may additionally or alternatively include an indication of the category and/or type of PII for each column.

Database metadata record 400 may include other metadata 412, which may include any suitable metadata not mentioned above. For example, other metadata 412 may include a summary of column information, e.g., an indication of what type of information is stored in the column (e.g., credit card numbers, emails, locations, etc.) or a value obtained from performing an operation on the values in the column (e.g., an average value). As another example, metadata 412 may include sizes of tables (e.g., number of rows, number of columns, total content size, or other suitable size information).

The database metadata record 400 may include the most current metadata for the database (e.g., the filename, machine identifier, schema information, index information, PII information, or other metadata for the latest version of the database, which may also be the most recent backup of the database). In various embodiments, the database metadata record 400 may additionally or alternatively include changes that have occurred to the metadata across various versions of the database. For example, the database metadata record 400 may include all of the changes that have occurred from the first version of the database to the most current version of the database or any subset thereof (e.g., the changes that have occurred in the last N versions of the database or over a certain time period).

The database metadata record 400 may include any suitable changes to the metadata. For example, database metadata record 400 may include tables, columns, and indexes that have been added, dropped, or edited (e.g., through a name or other parameter change) across multiple versions of the database. As another example, database metadata record 400 may include other changes to the schema, such as creation, deletion, or changes to primary or foreign keys. As another example, database metadata record 400 may include columns with PII information that have been added, dropped, or edited.

The changes may be stored in the database metadata record 400 in any suitable manner. For example, the database metadata record 400 may include an initial collection of the metadata and a list of the changes specifying when the changes were made and/or in which version of the database the changes were made. As another example, the database metadata record 400 could include a collection of the metadata for each version (or a subset of the versions) of the database that is backed up and the changes may be ascertained by comparing the collections against each other (where a timestamp and/or version number may also be stored for each different version).

The database metadata record 400 may be updated at any suitable time. In some instances, the database metadata record 400 is updated responsive to a backup of a database (e.g., after determining that at least one change to the metadata is present in the backup relative to the previous backup). Additionally or alternatively, a database may be periodically checked to determine whether the corresponding database metadata record 400 is to be updated. For example, the databases of an organization may be periodically scanned and/or accessed to determine whether the database metadata record 400 should be updated.

The collection of database metadata records 400 of an organization may be stored at any suitable location. For example, a database metadata record 400 may be stored with (e.g., in the same physical storage device) as the associated database backup(s). As another example, a database metadata record 400 may be stored in the same backend 106 as the associated database backup(s). As yet another example, a database metadata record 400 may be stored in a separate location from the associated database backup(s) (e.g., database metadata records 400 could be stored in a system of the enhanced database search system 108 or in a private cloud of the organization) so as to make searching of the collection of database metadata records 400 faster. As described above, in some embodiments, the database metadata records 400 are aggregated together into the same database file that is accessed when an enhanced search is performed.

Figure 5:
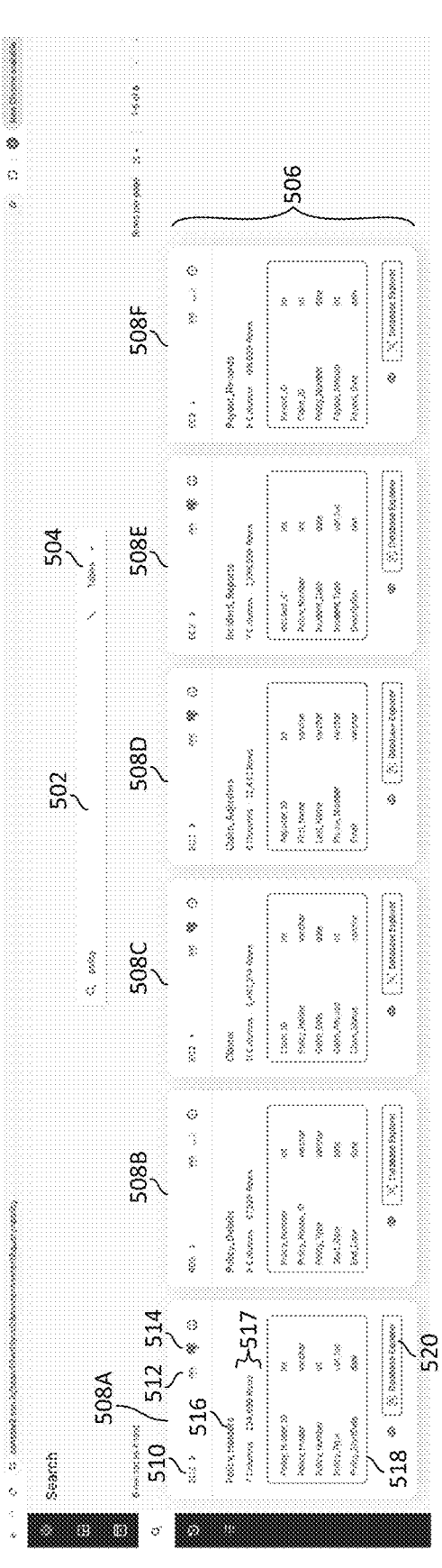
FIG. 5 illustrates an enhanced database search interface, in accordance with any of the embodiments disclosed herein.

FIG. 5 illustrates an enhanced database search interface 500, in accordance with any of the embodiments disclosed herein. In this embodiment, the enhanced database search interface 500 is provided through a web application (e.g., accessed through a web browser executed by a computing device 102), but could also be provided through a native application or by other suitable means.

The enhanced database search interface 500 includes a search bar 502 and a search type selector 504. A search expression is entered into the search bar 502 and a search category is selected via search category selector 504. In one embodiment, the search category selector 504 may allow for a file system search or a database search. In one example, the file system search may perform a search for files in a file system that match the search expression, while the database search (depicted in search category selector 504 as "Tables") may return results in which table names or contents thereof (e.g., column names, data within the table, etc.) of databases match the search expression. In the embodiment depicted, a database search is selected.

The search expression may be any combination of characters, words, operators, and/or symbols. The enhanced database search interface 500 may support any one or more types of searches, such as exact match searches, fuzzy searches (e.g., approximate matching), keyword stemming searches (e.g., the search result includes but is not an exact match with the searched term), synonym searches, semantic searches (a search engine technology that analyzes the meaning of words and phrases to return results that match the intent of a query, rather than just matching words), Boolean searches, wildcard searches, regular expressions searches, natural language searches, or any suitable combinations thereof. In various embodiments, the enhanced database search interface 500 may allow the user to specify the type(s) of search that is to be used. As one example, a user may select between an exact match search and a keyword stemming search. As another example, a user may select between an exact match search and a semantic search.

In the embodiment depicted, a user has entered "policy" into the search bar 502 as the search expression. A search results window 506 displays results 508 (e.g., 508A-F) returned by the search. In the depicted embodiment, the results include representations of tables that include either a table name or a column name that includes the search expression. For example, result 508A represents a table (Policy_Holders) that also includes columns (Policy_Holder_ID, Policy_Holder, Policy_Number, Policy_Type, and Policy_StartDate) that include the search expression "policy"; result 508B similarly includes the search expression in the name of the table and the names of various columns, result 508C includes the search expression in the name of at least one of its columns (Policy_Holder), result 508D may include the search expression in the name of at least one of its columns (e.g., one of the column names that is not shown), result 508E includes the search expression in the name of at least one of its columns (Policy_Number), and result 508F includes the search expression in the name of at least one of its columns (Policy_Number).

A result may include any suitable information about the database resource (e.g., the database itself or portion thereof such as a table, column, or other portion) represented by the result. For example, result 508A displays service type 510, service provider 512, database type 514, table name 516, size information 517, and field preview 518. Other embodiments may include different combinations of this information and/or other information about the resource.

Service type 510 may indicate the service that hosts the resource. In this instance, the service type is Amazon's Elastic Compute Cloud (EC2), indicating that the database that includes the resource is running inside of a virtual machine managed by the organization. As a contrast, in result 508B, the service type is Amazon's Relational Database Service (RDS), indicating that the database that includes the resource is within a managed database service.

Service provider 512 indicates an entity that provides the service that stores the database or database backup (e.g., the provider of the backend, private cloud, or other service). In each of the displayed results, the service provider is Amazon Web Services (AWS). In some embodiments, service provider 512 may include an icon. In some instances, the service provider could be the organization itself or a service associated with the organization (e.g., if the database is stored locally).

Database type 514 indicates a type of the database that includes the resource. For example, results 508A, 508C, 508D, and 508E display an icon that represents PostgresSQL while results 508B and 508F display an icon that represents MySQL.

Table name 516 is the name of the table that matched the search (in this instance because either the name of the table matched the search expression or the name of a column of the table matched the search expression).

Size information 517 may include any suitable information about the size of the resource. In the depicted embodiment, the size information 517 includes the number of columns and the number of rows in the table.

Field preview 518 may include information about the fields of the resource. In the embodiment depicted, field preview 518 includes the names of the first five columns of the table as well as the data type for each of the columns.

A result 508 may also include a database explorer option 520 that a user may select to view metadata about the database that includes the resource and/or the actual database contents. In some embodiments, the results 508 may only include metadata, while the information returned after the database explorer option 520 is selected may additionally include database contents (e.g., field values).

In other embodiments, the results 508 may include any suitable information. For example, a result 508 could include the latest version number of the database of the resource, a date that the database was backed up, an indication of whether the resource includes PII, indications of which columns include PII, edits made to the resource (e.g., which tables or columns were added, dropped, or otherwise changed relative to a different version), other metadata described herein (or changes thereto), or other suitable information.

In various embodiments, the enhanced database search interface 500 may provide any number of filtering options. Using the enhanced database search interface 500, the user may specify which filtering options are to be applied to the search. In various embodiments, the filtering options is used in combination with the search expression in the enhanced search and the results presented via the enhanced database search interface 500 are limited to those matching the filtering options as well as the search expression.

In one example, a search may be filtered by database backup source. For example, the enhanced database search interface 500 may include an option to select one or more sources (e.g., a private cloud, any one or more of backends 106) that are to be included in the search. In some instances, all sources may be selected (either explicitly or by default).

In another example, a search may be filtered to only include one or more types of metadata. For example, the search may be limited to any suitable selection of one or more of file names, machine identifiers, table names, column names, keys, indexes, columns including PII information, or any of the other metadata types referenced herein. In such embodiments, the search expression may be compared against the selected type(s) of metadata to find resources that match the search expression.

In another example, a search may be limited to metadata for the current database backup version for the databases. In another example, a search may be limited to metadata that was part of a change made in a database backup, such as an addition, deletion, or other edit. For example, such an embodiment may be useful when a user is trying to identify when a particular table or column (or other metadata) was added or deleted from a database. In yet another example, the search may include both the metadata for the most recent backup version as well as any changes to the metadata across any number of versions of backups (e.g., all or a subset thereof, such as the last N backups or backups made during a specified date range).

In another example, a search may be limited to a particular date range. For example, the search results may be limited to backups made within that date range.

In another example, a search may be limited to a particular size. For example, the search may be limited to tables with less than N rows, between N and M rows, or greater than N rows (where N may be any suitable integers provided by the user). As another example, the search may be limited to tables with less than N columns, between N and M columns, or greater than N columns.

The enhanced database backup searching methods and systems described herein may enable various use cases. Any one or more of the embodiments described herein may enable one or more of the following use cases. In a first use case, a user may search for databases and/or tables with column names that identically match a search expression. In a second use case, a user may search for databases and/or tables that include column names in which a search expression is a portion of the column name. In a third use case, a user may perform a semantic column name search (e.g., a search for a column including "last_name" may return databases with tables that have columns including "family_name"). In a fourth use case, a user may search for columns with certain types or categories of PII data. For example, a user may search for tables that include columns with credit card numbers or financial information. As another example, a user could simply search for tables with columns that include PII data. In a fifth use case, the user may search for a table that has had a particular column (matching the search expression) removed. In a sixth example, the user may search for a table that has had a particular column removed within a specified date range.

Figure 6:
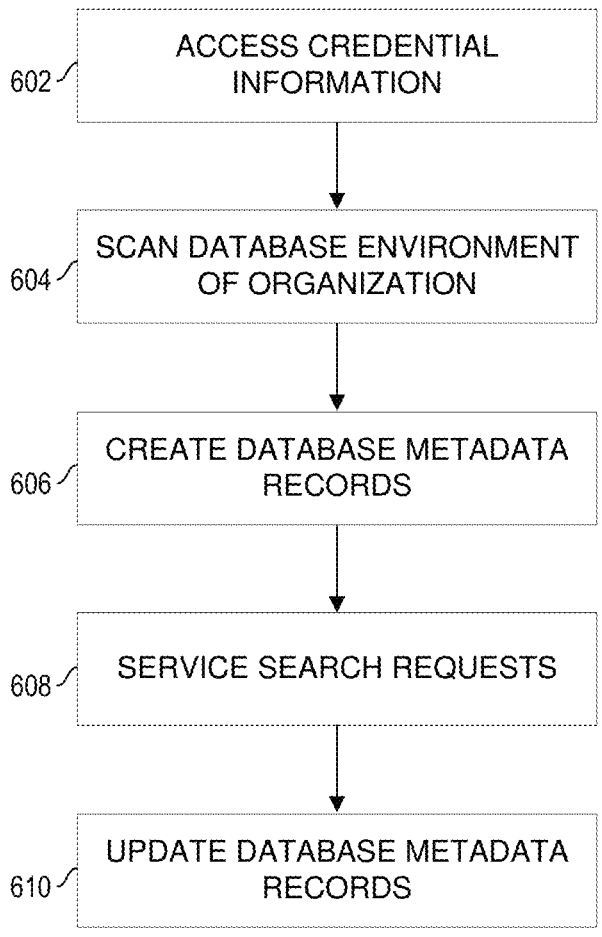
FIG. 6 illustrates an example flow for setting up enhanced searching of databases using database metadata records for an organization, in accordance with any of the embodiments disclosed herein.

FIG. 6 illustrates an example flow for setting up enhanced searching of databases using database metadata records for an organization, in accordance with any of the embodiments disclosed herein. The operations of the flow may be performed, e.g., by the enhanced database search system 108 alone or in combination with other suitable logic (e.g., enhanced database search interface 500).

At 602, credential information is accessed. In some instances, the enhanced database searching functionality may be provided as a service to a plurality of different organizations (or other users). When an organization registers to use the service, the organization may provide credentials (e.g., usernames, passwords, etc.) for accessing the databases of the organization. The organization may also provide any other suitable information needed to provide access to the databases, such as cryptographic keys for decrypting the databases. The organization may also grant access (e.g., read only access) to the databases of the organization to the enhanced search service provider (e.g., the operator of enhanced database search system 108). In some embodiments, the organization may delegate access to databases in one or more backends 106 using an IAM role that grants read access, e.g., to the enhanced database search system 108.

At 604, computing resources associated with the organization are scanned to identify the database resources (e.g., databases or components thereof). Any suitable computing resources may be scanned to identify the database resources, such as one or more local machines, local clouds, backends 106, other suitable computing resources, or combinations thereof. Snapshots of the identified database resources (including any suitable information that may be used to generate the database metadata records 400) may be created. For example, the snapshot may comprise a backup copy of the database, allowing restoration of a copy of the database at a particular point in time. In some embodiments, the snapshots are copied to the enhanced database search system 108. For example, these snapshots may be transferred to the organization's account (e.g., within enhanced database search system 108). Copying the snapshot to the enhanced database search system 108 may allow access to the database without disruptive operations to the production environment. In other embodiments, the databases could be accessed in any other suitable manner.

At 606, database metadata records 400 are created based on the snapshots. For example, the various databases of the organization may be iterated through. For a particular database, the snapshot corresponding to the database may be used to restore the database and then the database may be scanned for the relevant metadata. In some embodiments, when a database is to be analyzed, a virtual machine is created and attached to the database. The metadata of the database is then scanned and extracted to create a database metadata record 400 for the database. In some instances, various backup versions of a database may be scanned to obtain information on historical changes that occurred to the metadata and such changes are captured within the database metadata record 400.

In various embodiments, the database metadata records 400 may be organized in any suitable manner. In some embodiments, the database metadata records 400 may be aggregated together into a database (e.g., a relational (e.g., SQL) database or a noSQL database). In one embodiment, the database metadata record 400 are placed in an ElasticSearch database. In other embodiments, the database metadata records 400 may be stored as a set of indexed objects that can be read by a database or in other suitable manner (e.g., when a user submits a search, the objects may be iterated through to find the database resources that match the search). For example, because the amount of data is relatively small (even for a large number of databases), the metadata may be placed in objects (e.g., an object per database or an object per table) and the objects may be read responsive to a search. In some examples, historical metadata for a particular database and table may be aggregated together, e.g., based on the database name and table name. In general, the database metadata records 400 are stored in a format that is easily searchable.

In some embodiments, each database metadata record 400 for a table includes a time (e.g., the time that the table was backed up), a table name, a number of rows in the backup, and a list of columns (with a column name and a type of data of the column).

At 608, search requests are serviced by providing database metadata records (or information from such records) responsive to the search requests. In various embodiments, the enhanced database search system 108 may receive a search expression and/or filtering options and provide the database metadata records that match the search expression and/or filtering options (e.g., to a user via a web application that utilizes a user interface such as enhanced database search interface 500). In various embodiments, the web application may perform one or more queries based on the search expression and/or filtering options to a database that includes the database metadata records 400 to obtain the results that are presented to the user.

At 610, database metadata records are updated. For example, when the organization performs a database backup, a database metadata record updating process may be triggered to update the database metadata record or to create a new database metadata record if one does not already exist. As another example, the databases of the organization may be periodically scanned and accessed to determine whether the metadata has changed. If changes are detected, the associated database metadata record 400 is updated based on the changes.

Figure 7:
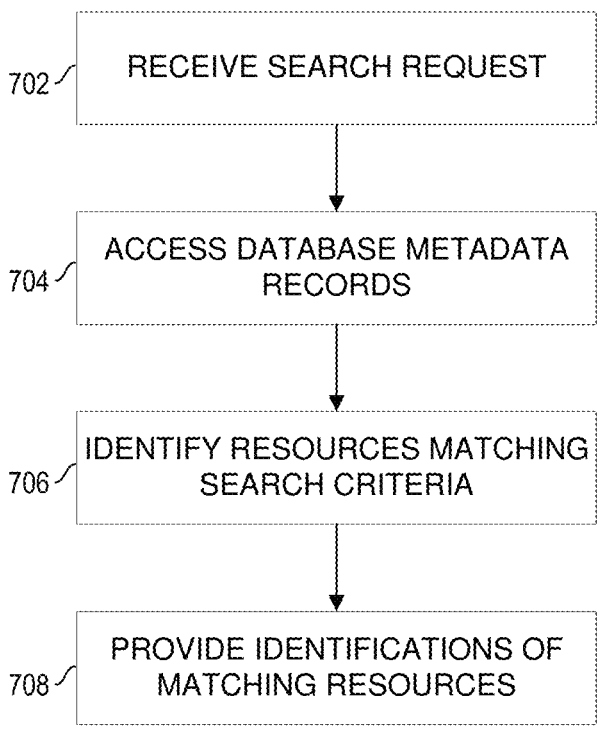
FIG. 7 illustrates an example flow for enhanced searching of databases using database metadata records, in accordance with any of the embodiments disclosed herein.

FIG. 7 illustrates an example flow for enhanced searching of databases using database metadata records, in accordance with any of the embodiments disclosed herein. The operations of the flow may be performed, e.g., by the enhanced database search system 108 alone or in combination with other suitable logic (e.g., enhanced database search interface 500).

At 702, a search request is received. In some instances, the search request may be received over a network 104 from a computing device 102 of a user of an organization. The search request may include search criteria (e.g., a search expression and/or filtering options). At 704, database metadata records 400 are accessed. At 706, database resources matching the search criteria are identified from the database metadata records 400. At 708, identifications of matching resources are provided. In some instances, the identifications may be provided to the computing device 102 that sent the request. The identifications may include any suitable information about the matching resources, such as table names, column names, PII information, other metadata described herein, or other suitable information.

It is important to note that the operations in FIG. 6 and FIG. 7 illustrate only some of the possible scenarios that may be executed by, or within, the various components of the systems described herein. Some of these operations may be removed or repeated where appropriate, or these steps may be modified or changed considerably without departing from the scope of the present disclosure. In addition, the timing of these operations may be altered considerably. The preceding operational flows have been offered for purposes of example and discussion.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. For example, the phrase "A and/or B" means (A), (B), or (A and B), while the phrase "A, B, and/or C" means (A), (B), (C), (A and B), (A and C), (B and C), or (A, B, and C).

As used throughout this description, and in the claims, a list of items joined by the term "at least one of" or "one or more of" can mean any combination of the listed terms.

What is claimed is:

1. A method for enhanced searching of databases using catalogued metadata, comprising:

scanning one or more computing resources within an organization to identify a plurality of database resources;

creating a plurality of snapshots of the identified plurality of database resources;

extracting metadata from each of the created plurality of snapshots to generate a plurality of database metadata records, wherein the generated plurality of database metadata records is used in providing the enhanced searching;

receiving a search request from a user;

responsive to the received search request, searching the generated plurality of database metadata records corresponding to a plurality of databases, a database metadata record of the plurality of database metadata records comprising a plurality of searchable metadata items of a database of the plurality of databases, wherein the plurality of searchable metadata items of the database metadata record includes a name of a table of the database; and providing search results responsive to the received search request, the search results comprising indications of at least a subset of the generated plurality of database metadata records that match the received search request.

2. The method of claim 1, wherein the plurality of databases include at least one of a database that hasn't been backed up, a database that has been backed up, and multiple versions of a database.

3. The method of claim 1, wherein the plurality of searchable metadata items includes an indication of a change to the table made between a first version of the database and a second version of the database.

4. The method of claim 3, wherein the change to the table comprises an addition or deletion of the table or a column of the table.

5. The method of claim 1, wherein the plurality of searchable metadata items includes names of columns of the table of the database.

6. The method of claim 1, wherein the plurality of searchable metadata items includes content types of columns of the table of the database.

7. The method of claim 1, wherein the plurality of searchable metadata items includes either one or both of indications of which columns of the table of the database include personally identifiable information and indications of types of personally identifiable information included within columns of the table.

8. The method of claim 1, further comprising:

copying at least one of the created plurality of snapshots to an enhanced database search system.

9. The method of claim 1, further comprising aggregating the plurality of database metadata records into at least one table of a database that is accessed responsive to the received search request.

10. A system for enhanced searching of databases using catalogued metadata comprising:

one or more processors configured to:

scan one or more computing resources within an organization to identify a plurality of database resources;

create a plurality of snapshots of the identified plurality of database resources;

extract metadata from each of the created plurality of snapshots to generate a plurality of database metadata records, wherein the generated plurality of database metadata records is used in providing the enhanced searching;

receive a search request;

responsive to the received search request, search the generated plurality of database metadata records corresponding to a plurality of databases, a database metadata record of the plurality of database metadata records comprising a plurality of searchable metadata items of a database of the plurality of databases, wherein the plurality of searchable metadata items of the database metadata record includes a name of a table of the database; and provide search results responsive to the received search request, the search results comprising indications of at least a subset of the generated plurality of database metadata records that match the received search request.

11. The system of claim 10, wherein the received search request comprises a search expression and identifying at least one search result comprises determining that the name of the table or a name of a column of the table exactly matches the search expression.

12. The system of claim 10, wherein the received search request comprises a search expression and identifying at least one search result comprises determining that a portion of the name of the table or a portion of a name of a column of the table matches the search expression.

13. The system of claim 10, wherein the received search request comprises a search expression and identifying at least one search result comprises determining that the name of the table or a name of a column of the table semantically matches the search expression.

14. The system of claim 10, wherein identifying at least one search result comprises finding one or more tables with a deleted table name or column name that matches a search expression of the received search request.

15. The system of claim 10, wherein identifying at least one search result comprises applying a date range specified in the search request during searching of the plurality of database metadata records to identify a change that occurred to a database within the date range.

16. The system of claim 15, wherein the change includes a deletion of a table name or a column name.

17. A non-transitory computer-readable medium storing a set of instructions for enhanced searching of databases using catalogued metadata, the set of instructions comprising:

one or more instructions that, when executed by one or more processors of a device, cause the device to:

scan one or more computing resources within an organization to identify a plurality of database resources;

create a plurality of snapshots of the identified plurality of database resources;

extract metadata from each of the created plurality of snapshots to generate a plurality of database metadata records, wherein the generated plurality of database metadata records is used in providing the enhanced searching;

responsive to the received search request, search the generated plurality of database metadata records corresponding to a plurality of databases, a database metadata record of the plurality of database metadata records comprising a plurality of searchable metadata items of a database of the plurality of databases, wherein the plurality of searchable metadata items of the database metadata record includes a name of a table of the database; and provide search results responsive to the received search request, the search results comprising indications of at least a subset of the generated plurality of database metadata records that match the received search request.

18. The medium of claim 17, wherein the plurality of searchable metadata items includes an indication of a change to the table made between a first version of the database and a second version of the database.

19. The medium of claim 17, wherein the plurality of searchable metadata items includes names of columns of the table of the database.

20. The medium of claim 17, wherein the plurality of searchable metadata items includes content types of columns of the table of the database.

* * * * *